United States Patent [19]

Fletcher-Jones

[11] Patent Number: 4,939,984

[45] Date of Patent: Jul. 10, 1990

[54] INVESTMENT-CAST PISTON CROWN CAP WITH ENCAPSULATED NON-METALLIC INSULATING CORE

[75] Inventor: David F. Fletcher-Jones, Holly Grove Cottage, England

[73] Assignee: AE PLC, Cawston, United Kingdom

[21] Appl. No.: 200,961

[22] Filed: Jun. 1, 1988

[30] Foreign Application Priority Data

Jun. 18, 1987 [GB] United Kingdom ................. 8714287

[51] Int. Cl.$^5$ ............................ F16J 1/01; F02F 3/26; F02F 3/14

[52] U.S. Cl. ........................................ 92/176; 92/212; 92/224; 123/193 P; 123/279; 29/888.045

[58] Field of Search ................. 92/173, 176, 186, 208, 92/212–213, 222, 224, 248; 123/41.35, 254, 276, 279, 193 P, 270, 271; 29/156.5 R

[56] References Cited

U.S. PATENT DOCUMENTS

| | | | |
|---|---|---|---|
| 2,880,044 | 3/1959 | Coffey | 92/213 X |
| 3,152,523 | 10/1964 | Whitfield et al. | 92/224 X |
| 3,616,729 | 11/1971 | Fischer | 92/176 |
| 3,882,841 | 5/1975 | Silverstein | 92/176 X |
| 4,018,194 | 4/1977 | Mitchell et al. | 123/41.35 X |
| 4,334,507 | 6/1982 | Kohnert et al. | 92/224 X |
| 4,356,800 | 11/1982 | Moebus | 92/222 X |
| 4,372,194 | 2/1983 | Vallaude | 92/224 X |
| 4,524,498 | 6/1985 | Hartsock | 92/212 X |
| 4,553,472 | 11/1985 | Munro et al. | 92/176 |
| 4,592,268 | 6/1986 | Hartsock | 92/224 X |
| 4,599,772 | 7/1986 | Graham | 92/224 X |
| 4,604,945 | 8/1986 | Mizuhara | 92/212 X |
| 4,651,630 | 3/1987 | Zeilinger et al. | 92/224 X |

FOREIGN PATENT DOCUMENTS

| | | |
|---|---|---|
| 0084385 | 7/1983 | European Pat. Off. |
| 0185352 | 6/1986 | European Pat. Off. |
| 1476142 | 3/1970 | Fed. Rep. of Germany |
| 1955903 | 5/1970 | Fed. Rep. of Germany |
| 869759 | 11/1941 | France ................. 92/224 |
| 151715 | 11/1979 | Japan ................. 123/279 |
| 202347 | 11/1983 | Japan ................. 123/193 P |
| 119348 | 6/1985 | Japan ................. 123/41.35 |
| 199561 | 10/1985 | Japan ................. 92/222 |
| 578120 | 7/1976 | Switzerland |
| 2125517 | 3/1984 | United Kingdom |
| 2168126 | 6/1986 | United Kingdom |

Primary Examiner—Carl D. Price
Assistant Examiner—George Kapsalas
Attorney, Agent, or Firm—William R. Hinds

[57] ABSTRACT

Pistons for internal combustion engines, particularly compression ignition engines. The pistons have insulating crowns and include a crown having a cap thereon, extending over the crown surface area, the crown cap being composed of an iron-based or a nickel-based alloy and having on the underside thereof ribs which are encast into an aluminium alloy which forms the piston body. The crown cap further includes a ceramic insert encapsulated therein. The ceramic insert may also be leached out by chemical means to leave a void in the cap.

14 Claims, 2 Drawing Sheets

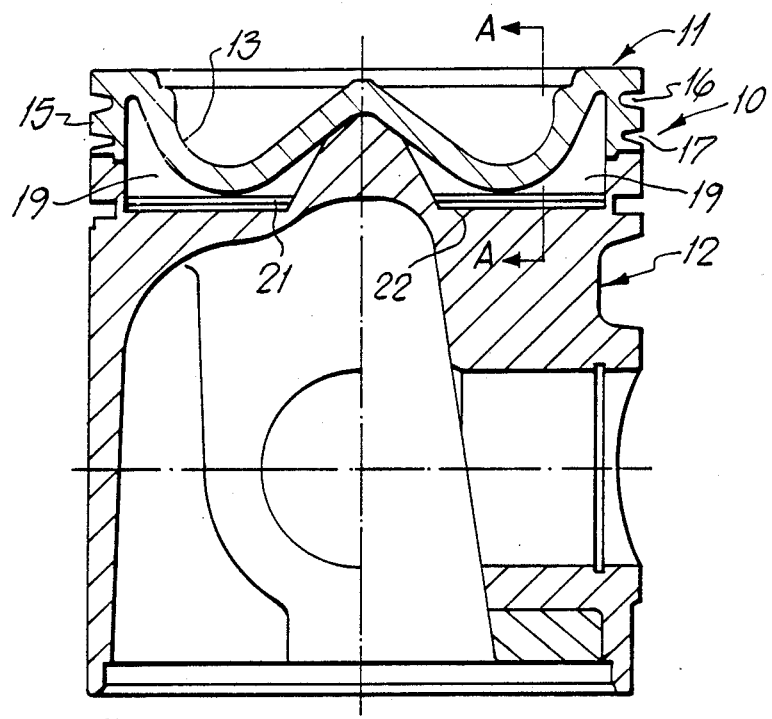
FIG.1
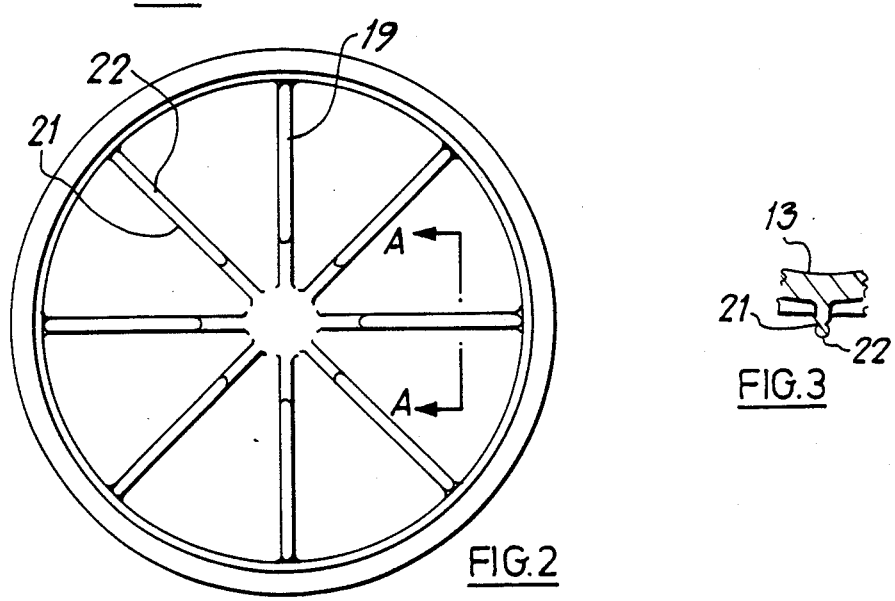
FIG.2
FIG.3

INVESTMENT-CAST PISTON CROWN CAP WITH ENCAPSULATED NON-METALLIC INSULATING CORE

BACKGROUND OF THE INVENTION

The present invention relates to pistons for internal combustion engines and particularly to pistons having insulated crowns for use in compression ignition engines.

Piston crowns having insulation to increase the operating temperature of the combustion chamber are well known. In most of the pistons shown in the prior art, however, the level of insulation is very high, usually seeking a temperature increase sometimes as high as 100%.

Although large temperature increases may be beneficial in terms of fuel efficiency it is now being realized that lower temperature increases are more beneficial in some respects. For example, it has been found that particulate emissions are significantly less at lower temperature increases. The reduction in particulate emissions at a crown surface temperature increase in the region of only 5% to 15% may be sufficient to allow the elimination of a very costly particulate trap from the engine exhaust system.

SUMMARY OF THE INVENTION

According to the present invention, a piston for an internal combustion engine comprises a crown portion and a body portion, the crown portion having a cap extending over the surface area thereof, the crown cap being an investment casting of an iron-based or a nickel-based alloy, the investment casting also having encasted and encapsulated therein a non-metallic insulating core.

In one embodiment of the present invention the piston body may be formed by a pressure casting method such as squeeze-casting.

Preferably the crown cap may also include an annular portion having one or more piston ring grooves. This removes the need to provide separate reinforcement of at least the topmost ring groove such as, for example, by a Ni-Resist cast iron insert bonded by the Alfin process. A further advantage of this is that the topmost ring groove may be positioned closer to the crown surface thus minimising the dead space above the piston ring. Such dead spaces not only affect particulate emissions but also have an adverse effect on other emission parameters of the engine.

Preferably the insulating core is a ceramic material, and preferably a ceramic body of the desired shape to be encapsulated is formed by one of a number of known techniques. The ceramic body is then placed and supported in the desired position in a die and liquid wax is injected around it, the overall wax shape then corresponding to that of the desired crown cap shape. A ceramic mould shell is then formed around the wax pattern in known manner and the wax melted out to leave the ceramic core in place and the void to be filled with molten metal.

The ceramic crown cap may advantageously also include apertures therein in order to control the heat conduction of the subsequently formed piston. By means of the apertures, which may be present in any desired pattern, size and distribution depending upon the specific engine or piston in question, the temperature distribution of the piston crown may thereby be controlled. A more uniform temperature distribution may, therefore, be achieved thus minimising the thermal stresses to which the crown cap and the underlying piston body are subject.

In an alternative embodiment the ceramic core may be leached out by chemical means leaving a void or air gap to increase insulation still further.

Also in accordance with the invention, a method of making a piston having a crown portion and a skirt portion for an internal combustion engine comprises the steps of making an iron-based or nickel-based alloy crown cap having therein an encasted and encapsulated ceramic core by an investment casting technique, placing the crown cap into a casting die, and casting an aluminium alloy onto the crown cap to form said skirt portion.

In one embodiment of the present invention, the piston body may be formed by a pressure casing method such as squeeze-casting.

BRIEF DESCRIPTION OF THE DRAWINGS

In order that the present invention may be more fully understood examples will now be described by way of illustration only with reference to the accompanying drawings of which:

FIG. 1 shows a section in two mutually perpendicular directions through a piston;

FIG. 2 shows the underside of the crown cap of the piston of FIG. 1;

FIG. 3 shows a section through the line AA of FIGS. 1 and 2 viewed in the direction of the arrows;

DETAILED DESCRIPTION OF THE PREFERRED EMBODIMENTS

Figure 4:
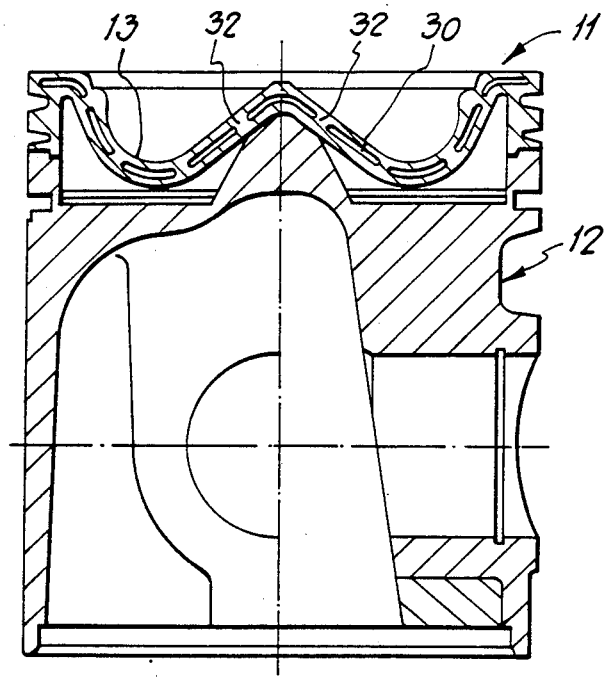
FIG. 4 shows a modified embodiment of the piston of FIG. 1 in accordance with the invention.

Referring now to FIGS. 1, 2 and 3 of the drawings and where the same features are denoted by common reference numerals.

A piston is shown generally at 10. The piston comprises a crown cap 11 and a body portion 12 of aluminium alloy formed by squeeze-casting. The cap 11 is an iron alloy investment casting having a combustion bowl 13 formed therein and is of about 6 mm in section thickness. The cap further comprises an annular portion 15 having the upper two piston ring grooves 16 and 17 formed therein. On the underside groove of the cap are eight radially directed webs 19 which serve to stiffen the cap between the combustion bowl 13 and the annular portion 15. The webs 19 also provide locking means by virtue of the grooves 21 in the edges 22 for the aluminium alloy cast thereabout.

Figure 5:
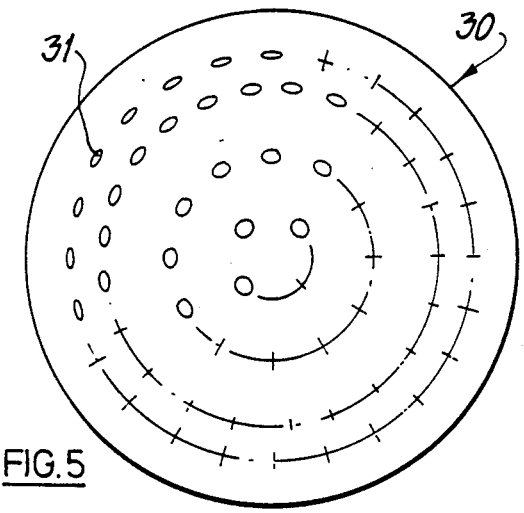
FIG. 5 which shows a plan view of the ceramic core of the piston of FIG. 4.

FIGS. 4 and 5 show an alternative embodiment to that shown in the preceding figures in that the cap 11 has encast therein a ceramic core 30. The crown cap and core is again made by the well-known technique of investment casting. The core 30 provides enhanced levels of insulation over the monolithic cap described above. The degree of insulation and the temperature distribution of the piston crown may be further controlled by means of the apertures 31 in the ceramic core shown in FIG. 5. The size and distribution of these apertures will depend upon the specific piston design and the desired objective. The objectives of insulation control and temperature distribution control is achieved by virtue of the fact that during encasting of the core into the crown cap the apertures 31 become filled with the metal being cast 32 thereby providing an array of heat conductive paths through the cap to the aluminium alloy of the piston body 12. The thickness of the core 30 and the metallic layers on either side may be about 2 mm each. This dimension may of course be varied in any desired manner. The ceramic core, for example, may be thinner or thicker depending upon the degree of insulation required; the metallic layers may be of dissimilar thicknesses.

In a modified alternative to the embodiment of FIGS. 4 and 5 the core piece 30 may be leached out to leave an air gap thereby increasing the degree of insulation of the crown. The heat conductive pieces 32 may still be present to control the temperature distribution of the crown and also the degree of insulation. The pieces 32 also stiffen the crown portion and prevent the air gap from being closed up in service.

I claim:

1. A piston for an internal combustion engine, the piston comprising a crown portion and a body portion, the crown portion having a cap extending over the surface area thereof, said crown cap being an investment casting of an iron-based or a nickel-based alloy, said investment casting also having encased and encapsulated therein a non-metallic insulating core.

2. A piston according to claim 1 wherein said insulating core is a ceramic material.

3. A piston according to claim 1 wherein said insulating core has an array of holes or apertures therethrough which are filled by the iron-based or nickel-based alloy of said crown cap.

4. A piston according to claim 1 wherein at least part of said insulating core is removed by chemical leaching to leave a core shaped void.

5. A piston according to claim 1 wherein said crown cap further includes an annular portion having at least one piston ring groove therein.

6. A piston according to claim 1 wherein said crown cap further includes on the underside thereof ribs which are encased in an aluminium alloy which forms the piston body portion.

7. A piston according to claim 6 wherein said ribs are radially directed.

8. A method of making a piston having a crown portion and a skirt portion for an internal combustion engine, the method comprising the steps of making an iron-based or nickel-based alloy crown cap having therein an encased and encapsulated ceramic core by an investment casting technique, placing the crown cap into a casting die and casting an aluminium alloy onto said crown cap to form said skirt portion.

9. A method according to claim 8 wherein at least part of said encapsulated ceramic core is removed by a chemical leaching technique.

10. A method according to claim 8 wherein said aluminium alloy is cast onto said crown cap using a pressure casting technique.

11. A method according to claim 8 wherein said encapsulated ceramic core is provided with an array of holes or apertures therethrough which are filled with the metal of the crown cap during the investment casting step.

12. A method according to claim 11 wherein said encapsulated ceramic core is removed by a chemical leaching technique.

13. A method according to claim 12 wherein said pressure casting technique is squeeze-casting.

14. A method according to claim 12 wherein said crown cap is provided with ribs on the underside thereof.

* * * * *